June 23, 1931.     T. C. ORR     1,811,437
STOCK AND POULTRY HOOK
Filed Oct. 1, 1929
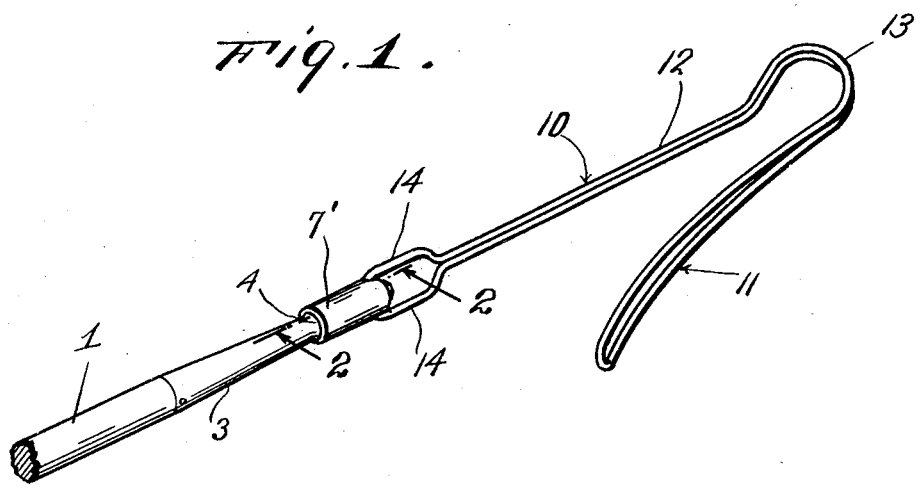
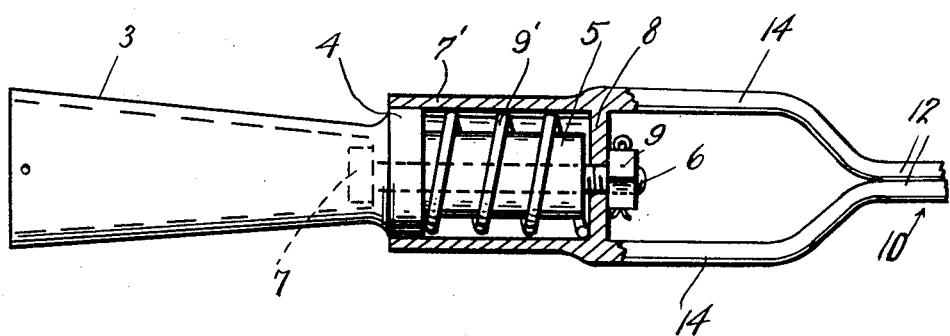
Inventor.
Thomas C. Orr
By *Clarence A. O'Brien*
Attorney Patented June 23, 1931

1,811,437

UNITED STATES PATENT OFFICE

THOMAS CLARENCE ORR, OF WILLOWS, CALIFORNIA

STOCK AND POULTRY HOOK

Application filed October 1, 1929. Serial No. 396,501.

This invention relates to stock and poultry hooks of the type wherein a resilient hook is mounted on an elongated handle in the hands of an operator for the purpose of engaging said hook with the leg of the animal when it is desired to capture said animal.

One of the objects of the invention is to provide, in a manner as hereinafter set forth, a hook of the aforementioned character having means for swivelly coupling the hook to the handle bracket for the purpose of eliminating the danger of injury to the animal's leg should said animal twist its leg in the hook and should the operator inadvertently twist the hook itself on the animal's leg.

Another object of the invention is to provide a stock and poultry hook of the aforementioned character wherein the swivelled hook is provided with frictional means for exerting a restraining force on the hook to prevent same from rotating too freely on the handle.

Other objects of the invention are to provide a hook of the aforementioned character which will be simple in construction, strong, durable, efficient in its use and which may be manufactured at low cost.

Other objects and advantages of the invention will become apparent from a study of the following specification, taken in connection with the accompanying drawings, wherein like characters of reference designate corresponding parts throughout the several views, and wherein:—

Figure 1 is a perspective view showing an end portion of the handle with the swivelly mounted hook connected thereto.

Figure 2 is a fragmentary side elevation, partly broken away in section on the line 2—2 of Figure 1 and showing the swivelled connection by which the hook is coupled to the handle.

Referring to the drawings in detail, the reference character 1 designates the end portion of an elongated handle to which is secured a tapered socket 3 having an enlarged head or flange 4 on its forward end portion. A longitudinally and forwardly extending shank 5, of less diameter than the flange 4, is formed integral with the forward face of said flange. The shank 5, flange 4 and the adjacent end portion of the socket forming sleeve 3 are provided with a longitudinal centrally disposed bore through which extends a threaded bolt 6 having a head 7 on one end disposed within the socket 3 and in abutting relation with the forward end wall of said socket.

A tubular sleeve 7' encloses the shank 5 and has an open rear end which slidably and rotatably encircles the flange 4, as seen most clearly in Figure 2 of the drawings. The forward end of the sleeve 7' is provided with a closure wall 8 provided with a centrally disposed opening through which the forward end of the threaded bolt 6 extends and a retaining nut 9 is threaded on the free end portion of the bolt 6 for securing or retaining the sleeve 7' in position in a manner to allow longitudinal movement of said sleeve on the flange 4 and the threaded bolt 6. A coil spring 9' encircles the shank 5 and the ends of said coil spring impinge the flange 4 and the end wall 8 of the sleeve 7'.

A hook 10, of appropriate shape is integrally connected with the sleeve 7' at its forward end and said hook comprises an elongated rod bent upon itself to provide a bill portion 11, a shank portion 12, intermediate connecting portions 13, and the spaced connecting portions 14 which are connected to the sleeve 7' on diametrically opposite sides of said sleeve.

It will thus be seen that the hook 12 will rotate on the handle 1 when a slight twisting strain is exerted thereon, but said hook is restrained from swivelling freely on said handle through the medium of the coil spring 9' which urges the end wall 8 into frictional engagement with the securing nut 9. The tension of the coil spring 9', and consequently the frictional resistance created thereby, may be regulated by threading the nut longitudinally on the securing bolt 6.

It is believed that the many advantages of a stock and poultry hook constructed in accordance with this invention will be readily understood, and although the preferred embodiment of the invention is as illustrated and described, it is to be understood that changes in the details of construction may be had which will fall within the scope of the invention as claimed.

What is claimed is:—

1. A stock and poultry hook of the character described comprising a socketed thimble for mounting on a handle, a laterally extending flange on the thimble, a forwardly extending shank of less diameter than the flange connected thereto, a tubular sleeve having one end slidably and rotatably mounted on the flange, said sleeve extending over the shank in spaced relation thereto and having an end wall adjacent the end of the shank, said shank, the flange and the end wall being provided with longitudinally aligned openings, a threaded shank anchored in the thimble and extending through the aligned openings, a securing nut threaded on the forward end of the threaded shank in a manner to secure the sleeve in position and a hook extending forwardly from the sleeve.

2. A stock and poultry hook of the character described comprising a socketed thimble for connection with a handle and provided with an end closure, a flange extending circumferentially around said thimble at its closed end, a shank, of less diameter than the flange, extending forwardly therefrom and connected thereto, a tubular sleeve having an open end slidably and rotatably mounted on the flange, said sleeve having its opposite end closed, the closed end of the sleeve, the shank, the flange and the end closure of the thimble being provided with longitudinally aligned bores, a threaded shank extending longitudinally through the bores and having a retaining head anchored in the thimble, the forward end of the threaded shank extending beyond the end wall of the sleeve and having a securing element mounted thereon for retaining the sleeve in position, a hook mounted on said sleeve and extending forwardly therefrom and an expansible coil spring encircling the shank with its opposite end impinging the flange and the end wall of the sleeve in a manner to frictionally engage the same with the securing element on the threaded shank.

In testimony whereof I affix my signature.

THOMAS CLARENCE ORR.